BAKING ACID AND BAKING POWDER CONTAINING THE SAME

Robert M. Lauck and James W. Tucker, Park Forest, Ill., assignors to Stauffer Chemical Company, New York, N.Y., a corporation of Delaware
No Drawing. Filed July 18, 1960, Ser. No. 43,287
10 Claims. (Cl. 99—95)

This invention relates to a new baking acid composition and to baking powders incorporating the same.

In particular this invention relates to a new baking acid comprising the combination of sodium aluminum phosphate and an edible aluminum salt. This combination has been found to be particularly advantageous in baking cakes both commercially and in prepared cake mixes.

By using this combination we have found that the tolerance to variation in the proportions of ingredients is markedly increased without sacrificing the quality of the finished cake. This is most noticeably true in cakes using the recently developed lactylated shortenings.

It is well known in the art to use various acid phosphate salts as leavening agents. It is also well known to use certain acid aluminum salts such as sodium aluminum sulfate for this purpose. In addition, the use of sodium aluminum phosphate (hereafter SAP) as a baking acid is disclosed in U.S. Patents 2,550,490 and 2,550,491.

We have now found that an unexpectedly new result is accomplished if a source of a trivalent aluminum cation is added to the SAP baking acid. This result is apparently due solely to the presence of this aluminum ion, since addition of more aluminum during the manufacture of SAP does not produce this same result. This is thought to be due to the fact that SAP ionizes so as to leave the aluminum in the complex anion. Therefore the addition of additional aluminum in the form of a cation appears to produce our new and unexpected results. We have also determined that this is due to the aluminum ion and not the sulfate ion since equivalent amounts of sodium sulfate or calcium sulfate do not produce this effect.

The aluminum salts most suitable for our invention appear to be most any salt which will furnish trivalent aluminum ion. It is of course necessary that a baking acid contain only edible salts. Typical salts which we have found satisfactory include aluminum sulfate, aluminum acetate and aluminum formate. In particular we find that anhydrous aluminum sulfate gives excellent results.

We have found that we may add as little as 1 to 2 parts of aluminum salt per 100 parts of SAP with improved results. It is also possible to add as much as 15 parts of aluminum salt per 100 parts SAP in some cases. As this high level is approached, however, there is a tendency to impair the flavor of the finished product. Our preferred range of proportions is more nearly in the range of 5 to 10 parts of SAP. A particularly preferred combination comprises 7 parts anhydrous aluminum sulfate and 100 parts of SAP.

The SAP which we prefer to use for the purposes of this invention is a complex, acidic soluble compound which may be represented generally by the formula

This compound may be either crystalline or amorphous in nature. One satisfactory form of this product is the crystalline compound of the formula

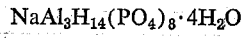

which is disclosed in U.S. Patent 2,550,490. Further, various dehydrated modifications of this product containing from zero to four moles of hydrate water have also been found satisfactory. These compounds are disclosed in Knox et al. application Serial No. 659,477, filed May 16, 1957.

An amorphous form of this product having the empirical formula $NaAl_3H_{11}(PO_4)_7 \cdot 5\text{—}8H_2O$ has also been found satisfactory. This product gives a blank powder X-ray diffraction pattern which indicates its amorphous nature. Since it cannot be crystallized and thus purified for further characterization, the above formula is only an empirical formula based upon analytical data. The product is described and claimed in Dyer application, Serial No. 860,191 filed December 17, 1959.

Other similar compounds which we have found suitable for use in our invention may be represented by the formulas

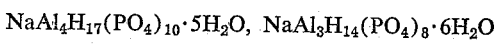

and

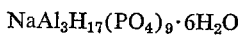

It is difficult to positively identify such complex compounds. The term sodium aluminum phosphate (SAP) used herein is intended to include all of the above described compositions.

We have found that our improved baking acid combination is of particular value when used in cake recipes using the so-called lactylated or GLP type shortenings. This highly emulsified type of shortening usually produces fast whipping, very light cake batters. These shortenings are manufactured by combining with the usual mono- and diglyceride one or more molecules of lactic acid. Similar highly emulsified shortenings are also produced by adding propylene glycol to various well known shortenings. See for example, Cereals as Food and Feed, by S. A. Matz (Avi 1959), p. 346 et seq.

The improved results which we have obtained by the use of our new combination may be best described simply as increased tolerance to the many variables involved in baking. In particular, we find that standard recipes may be varied widely, with respect to the amounts of ingredients, with less adverse effects than would result from similar variances when using the common well known baking acids. We find the most significant results lie in the area of liquid tolerance and leavening tolerance. In addition we find improved results with respect to sugar tolerance, shortening tolerance, mixing tolerance and baking time tolerance. In addition, we find that variations between different flours are minimized when using our new baking acid. These tolerances are discussed more fully in connection with the subsequent examples.

We also find that the use of our new baking acid provides an improved eating quality in the finished product. The products are more tender and less gummy. Also in the case of prepared packaged mixes there is a greater stability of the product when compared with such commonly used baking acids as sodium acid pyrophosphate, the combination of sodium acid pyrophosphate and heat treated anhydrous monocalcium phosphate, or the combination of heat treated anhydrous monocalcium phosphate and dicalcium phosphate.

In evaluating the performance of our new baking acid the following general procedure was used. A certain basic recipe was first adopted for both the commercial type cakes and the prepared mix type cakes. These formulations are more or less standard in the industry. Variations were then made in the amounts of various ingredients, mixing time, baking temperature, etc. as shown hereinafter. Each one of these cakes was then baked in an eight inch round pan under standard conditions. The resulting cake is then generally cut in half and examined as to grain structure, amount of rise or dip from a level top, tenderness, and eating quality in general.

For the purpose of evaluating the important quality of symmetry in the cake, that is, whether it is dipped or rounded, we have devised the following scale based on an eight inch cake.

Term: | Numerical equivalent
--- | ---
Severe dip | 0.4 inch dip.
Dip (or dipped) | 0.3 inch dip.
Slight dip | 0.2 inch dip.
Very slight dip | 0.1 inch dip.
Level | No dip.
Very slightly rounded | 0.1 inch rise.
Slightly rounded | 0.2 inch rise.
Moderately rounded | 0.3 inch rise.
Rounded (or round) | 0.4 inch rise.

The following examples illustrate the value of our new baking acid.

SERIES I

This series of comparative tests was based upon a standard white 130% sugar cake used commercially and having the following basic formula:

| | Parts |
| --- | --- |
| Flour | 100 |
| Sugar | 130 |
| Powdered milk (non-fat milk solids) | 5 |
| Salt | 1.75 |
| Shortening (GLP) | 26 |
| Sodium bicarbonate | 1.63 |
| Baking acid (N.V.=90) | 1.80 |
| Egg white | 55 |
| Water | 100 |

EXAMPLE 1

*Effect of Varying Amounts of Added Aluminum Sulfate*

| SAP, Percent | $Al_2(SO_4)_3$ | Specific Volume [1] | Symmetry |
| --- | --- | --- | --- |
| 100 | | 3.29 | Sl. dip. |
| 98 | 2 | 3.22 | Do. |
| 95 | 5 | 3.22 | V. sl. dip. |
| 91 | 9 | 3.29 | Sl. round. |
| 87 | 13 | 3.32 | Mod. round. |
| 83 | 17 | 3.39 | Do. |

[1] Represents volume in cc. per gram of cake.

EXAMPLE 2

*Effect of Varying Amounts of Aluminum Acetate*

| SAP, Percent | Al Acetate | Specific Volume | Symmetry |
| --- | --- | --- | --- |
| 100 | | 3.42 | Dipped. |
| 98 | 2 | 3.50 | Sl. round, sl. tendency to dip. |
| 96 | 4 | 3.49 | Sl. round. |
| 94.5 | 5.5 | 3.51 | Do. |
| 92.5 | 7.5 | 3.47 | Do. |
| 91 | 9 | 3.49 | Do. |
| 83 | 17 | 3.33 | Do. |

EXAMPLE 3

*Effect of Varying Amounts of Aluminum Formate*

| SAP, Percent | Al Formate | Specific Volume | Symmetry |
| --- | --- | --- | --- |
| 100 | | 3.38 | Sl. dipped. |
| 91 | 9 | 3.31 | V. sl. dipped. |
| 83 | 17 | 3.29 | Mod. round. |

EXAMPLE 4

*Effect of Varying Amounts of Sugar*

| Percent sugar (Based on Flour) | Specific Volume | | Symmetry | |
| --- | --- | --- | --- | --- |
| | SAP [1] | SAP—$Al_2(SO_4)_3$ | SAP | SAP—$Al_2(SO_4)_3$ |
| 110 | 3.43 | 3.48 | Sl. dip | Mod. round. |
| 120 | 3.28 | 3.42 | Dipped | Do. |
| 130 | 3.26 | 3.43 | Sl. dip | V. sl. round. |
| 140 | 3.14 | 3.18 | Dipped | V. sl. dip. |

[1] In this and the following examples cakes were baked using both SAP and SAP plus added aluminum in order to compare the present invention with the prior art. The SAP—$Al_2(SO_4)_3$ combination was always in the ratio of 100/7.

EXAMPLE 5

*Effect of Varying Amounts of Shortening*

| Percent Shortening (Based on Flour) | Specific Volume | | Symmetry | |
| --- | --- | --- | --- | --- |
| | SAP | SAP—$Al_2(SO_4)_3$ | SAP | SAP—$Al_2(SO_4)_3$ |
| 30 | 3.13 | 3.25 | Dipped | V. sl. dip. |
| 33 | 3.15 | 3.25 | do | Do. |
| 36 | 3.35 | 3.53 | V. sl. dip | Mod. round. |
| 39 | 3.23 | 3.36 | Sl. dip | Do. |

EXAMPLE 6

*Effect of Varying Amounts of Water With Two Types of Flour*

(a) SNOWSHEEN FLOUR

| Percent Water (Based on Flour) | Specific Volume | | Symmetry | |
| --- | --- | --- | --- | --- |
| | SAP | SAP—$Al_2(SO_4)_3$ | SAP | SAP—$Al_2(SO_4)_3$ |
| 80 | 3.16 | 3.17 | Mod. round | Mod. round. |
| 85 | 3.26 | 3.29 | do | Do. |
| 90 | 3.01 | 3.18 | Sl. shrinkage | Do. |
| 95 | 2.90 | 3.11 | Mod. shrinkage | Sl. round. |
| 100 | 2.72 | 3.32 | Excessive shrinkage | Round. |

(b) SOFT-A-SILK FLOUR

| Percent Water (Based on Flour) | Specific Volume | | Symmetry | |
| --- | --- | --- | --- | --- |
| | SAP | SAP—$Al_2(SO_4)_3$ | SAP | SAP—$Al_2(SO_4)_3$ |
| 80 | 2.51 | 3.34 | Dipped | V. sl. round. |
| 90 | 2.50 | 3.38 | Mod. dip | Mod. round. |
| 100 | 2.51 | 3.09 | Sl. dip | Do. |
| 110 | 2.55 | 3.00 | V. sl. dip | Do. |

EXAMPLE 7

*Effect of Added Aluminum Ion in Combination With Other Well Known Baking Acids*

| Baking Acid | Specific Volume | Symmetry |
| --- | --- | --- |
| Heat treated anhydrous monocalcium phosphate | 3.05 | Dipped. |
| Heat treated anhydrous monocalcium phosphate+$Al_2(SO_4)_3$ (100/7) | 2.89 | Do. |
| Sodium acid pyrophosphate | 2.60 | Severe dip. |
| Sodium acid pyrophosphate+$Al_2(SO_4)_3$ (100/7) | 2.54 | Do |

SERIES II

This series of comparative tests was based upon a prepared white cake mix having the following basic formula:

| | Percent |
|---|---|
| Flour | 37.20 |
| Sugar | 43.40 |
| Non-fat milk solids | 3.10 |
| Corn sugar | 1.50 |
| Salt | .70 |
| Sodium bicarbonate | .78 |
| Baking acid (N.V.=90) | .92 |
| Wheat starch | 2.00 |
| Shortening (GLP) | 10.40 |

To 20 oz. of the above mix was added 1¼ cups water and two egg whites.

EXAMPLE 8

*Effect of Varying Amounts of Shortening*

| Shortening | SAP—$Al_2(SO_4)_3$ | | SAP | | Baking Acid A [1] | |
|---|---|---|---|---|---|---|
| | Sp. Vol. | Grain [2] | Sp. Vol. | Grain | Sp. Vol. | Grain |
| 21% (flour basis) | 3.15 | Mod. fine. | 3.13 | Mod. fine. | 3.04 | Sl. fine. |
| 27% | 3.11 | Fine. | 3.09 | do. | 3.05 | Do. Sl. irreg. |
| 32% | 3.04 | Mod. fine. | 3.00 | do. Sl. irreg. | 2.90 | Sl. fine. Sl. irreg. |
| 36% | 2.90 | Fine. | 2.88 | Fine. | 2.87 | Mod. fine. Sl. irreg. |

[1] Baking Acid A represents a mixture of 60 parts sodium acid pyrophosphate and 40 parts of heat treated anhydrous monocalcium phosphate. This mixture is often used commercially.
[2] In Series II "Grain" includes comments on symmetry if noteworthy.

EXAMPLE 9

*Effect of Varying Amounts of Leavening*

| Soda | SAP—$Al_2(SO_4)_3$ | | SAP | | Baking Acid A | |
|---|---|---|---|---|---|---|
| | Sp. Vol. | Grain | Sp. Vol. | Grain | Sp. Vol. | Grain |
| 0.64% (total wt.) | 3.31 | Fine, even. | 3.26 | Fine, sl. Irreg. | 3.10 | Sl. fine, Sl. irreg. |
| 0.68% | 3.35 | do. | 3.26 | Fine, even. | 3.14 | Mod. fine. |
| 0.72% | 3.37 | do. | 3.18 | Sl. fine, Sl. irreg. | 3.08 | Sl. coarse, Irreg. |
| 0.76% | 3.30 | Mod. fine, Sl irreg. | 3.20 | do. | 3.07 | Coarse, Irreg. |
| 0.80% | 3.18 | do. | 3.21 | Sl. dipped. | 3.13 | Do. |
| 0.85% | 3.32 | Mod. fine, V. sl. irreg. | 3.17 | Mod. fine, Sl. irreg. | 3.06 | Do. |

EXAMPLE 10

*Effect of Varying Amounts of Liquid*

| Water | SAP—$Al_2(SO_4)_3$ | | SAP | | Baking Acid A | |
|---|---|---|---|---|---|---|
| | Sp. Vol. | Grain | Sp. Vol. | Grain | Sp. Vol. | Grain |
| 1 cup | 3.21 | V. sl. dip. | 3.06 | Dipped. | 2.93 | Dipped. |
| 1⅛ cups | 3.22 | Sl. round, fine, even. | 3.20 | V. sl. rnd. fine, sl. irreg. | 2.92 | Sl. dipped. |
| 1¼ cups | 3.11 | Fine, even. | 3.12 | Fine, even. | 3.00 | Sl. fine Sl. Irreg. |
| 1⅜ cups | 2.99 | do. | 2.97 | Mod. fine, Sl. irreg. | 2.77 | Sl. coarse Irreg. |
| 1½ cups | 2.78 | Mod. fine. | 2.79 | Mod. fine. | 2.71 | Sl. compact. |

EXAMPLE 11

*Effect of Varying Baking Temperatures*

| Temperature, °F. | SAP—$Al_2(SO_4)_3$ | | SAP | | Baking Acid A | |
|---|---|---|---|---|---|---|
| | Sp. Vol. | Grain | Sp. Vol. | Grain | Sp. Vol. | Grain |
| 330 | 3.26 | Mod. fine, even. | 3.13 | Mod. fine, Sl. irreg. | 3.09 | Sl. fine, Sl. irreg. |
| 350 | 3.12 | do. | 2.89 | Sl. fine, Sl. irreg. | 2.84 | Do. |
| 375 | 2.97 | do. | 2.91 | V. sl. dip. | 2.85 | Sl. dip. |

It is very clear from a close study of the foregoing examples that the use of our new baking acid consistently produces a baked product with a higher specific volume, improved symmetry and better grain structure. These results are all accomplished in the face of extreme variation in all the variables to which such baking process is subject.

We have also found that our new improved baking acid combination may be used in other well known modifications. Thus it is possible to use this baking acid in combination with heat treated anhydrous monocalcium phosphate, sodium acid pyrophosphate, sodium aluminum sulfate, dicalcium phosphate, etc. It is also possible to add certain well known conditioning agents such as tricalcium phosphate, starch, etc. to improve the free-flowing qualities under some conditions. It is also possible to incorporate our new baking acid in standard baking powder formulations.

In preparing commercial baking powders it is customary to use about 30 parts sodium bicarbonate, sufficient baking acid, depending upon the neutralizing value (N.V.), to release all the $CO_2$, and sufficient starch to total 100 parts by weight. Thus a given weight of any baking powder will release the same amount of $CO_2$. The neutralizing value of a baking acid is the amount of sodium bicarbonate necessary to neutralize the acidity of 100 grams of the acid. In our experience, we have used various modifications of SAP to give baking acids with neutralizing values of from about 70 to 100. Therefore, baking powders using these products would have approximately the following formulations:

| No. | 1 | 2 | 3 |
|---|---|---|---|
| N.V. of Baking Acid | 70 | 90 | 100 |
| Sodium bicarbonate, parts | 30 | 30 | 30 |
| Baking Acid, parts | 43 | 33 | 30 |
| Starch, redried corn, parts | 27 | 37 | 40 |
|  | 100 | 100 | 100 |

EXAMPLE 12

In order to demonstrate the use of these baking powders, a 130% sugar cake such as described for Series I above was baked. In place of the sodium bicarbonate and baking acid described in the formula, a prepared baking powder having the composition of Formula 2 above was used. This resulted in a cake with a slightly improved specific volume and of slightly better quality.

Similar cakes baked with modifications of this formula in accordance with the foregoing discussion have shown that our new baking acid combination may be successfully used in commercial baking powders.

The foregoing description is given for clearness of understanding only and no unnecessary limitations should be derived therefrom.

We claim:

1. As a new baking acid, the combination comprising 100 parts sodium aluminum phosphate and 1 to 15 parts of an edible salt yielding a trivalent aluminum cation.

2. As a new baking acid, the combination comprising 100 parts sodium aluminum phosphate and 1 to 15 parts of aluminum sulfate.

3. As a new baking acid, the combination comprising 100 parts sodium aluminum phosphate and 1 to 15 parts of aluminum formate.

4. As a new baking acid, the combination comprising 100 parts sodium aluminum phosphate and 1 to 15 parts of aluminum acetate.

5. As a new baking acid, the combination comprising 100 parts sodium aluminum phosphate and about 7 parts of aluminum sulfate.

6. A baking powder composition comprising approximately 30 parts sodium bicarbonate, 30 to 43 parts of the composition of claim 1 and sufficient starch to total 100 parts.

7. A baking powder composition comprising approximately 30 parts sodium bicarbonate, 30 to 43 parts of the composition of claim 2 and sufficient starch to total 100 parts.

8. A baking powder composition comprising approximately 30 parts sodium bicarbonate, 30 to 43 parts of the composition of claim 3 and sufficient starch to total 100 parts.

9. A baking powder composition comprising approximately 30 parts sodium bicarbonate, 30 to 43 parts of the composition of claim 4 and sufficient starch to total 100 parts.

10. A baking powder composition comprising approximately 30 parts sodium bicarbonate, 30 to 43 parts of the composition of claim 5 and sufficient starch to total 100 parts.

References Cited in the file of this patent

UNITED STATES PATENTS

| 2,372,402 | Stokes et al. | Mar. 27, 1945 |
| 2,550,491 | McDonald | Apr. 24, 1951 |